(12) United States Patent
Nishimura et al.

(10) Patent No.: US 7,399,214 B2
(45) Date of Patent: Jul. 15, 2008

(54) METHOD OF MANUFACTURING ELECTRON EMISSION SOURCE

(75) Inventors: Kunihiko Nishimura, Tokyo (JP); Naoki Yasuda, Tokyo (JP); Yosuke Suzuki, Tokyo (JP); Yoshinobu Hirokado, Tokyo (JP); Satoru Kawamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/416,319

(22) Filed: May 3, 2006

(65) Prior Publication Data

US 2006/0258254 A1    Nov. 16, 2006

(30) Foreign Application Priority Data

May 11, 2005    (JP)    ............................. 2005-138715

(51) Int. Cl.
*H01J 9/24*    (2006.01)
(52) U.S. Cl. ........................................... 445/49; 445/51
(58) Field of Classification Search ................. 430/311, 430/312, 313, 314, 315; 445/23–25, 49–51
See application file for complete search history.

(56) References Cited

U.S. PATENT DOCUMENTS

| | | | | |
|---|---|---|---|---|
| 4,207,105 A | * | 6/1980 | Sato | ............................ 430/432 |
| 5,501,893 A | * | 3/1996 | Laermer et al. | .............. 428/161 |
| 6,517,912 B1 | * | 2/2003 | Morfill et al. | ................ 427/570 |
| 7,115,013 B2 | * | 10/2006 | Liu et al. | ....................... 445/50 |
| 2003/0143398 A1 | * | 7/2003 | Ohki et al. | ................... 428/398 |
| 2003/0213893 A1 | * | 11/2003 | Nagahama et al. | ........... 250/210 |
| 2004/0043219 A1 | * | 3/2004 | Ito et al. | ...................... 428/408 |
| 2004/0108515 A1 | * | 6/2004 | Muroyama et al. | ........... 257/144 |
| 2004/0169151 A1 | * | 9/2004 | Yagi et al. | .................. 250/492.2 |
| 2004/0191698 A1 | * | 9/2004 | Yagi et al. | .................... 430/320 |

FOREIGN PATENT DOCUMENTS

| | | |
|---|---|---|
| JP | 2002-140979 | 5/2002 |
| JP | 2002-270087 | 9/2002 |
| JP | 2004-335285 | 11/2004 |
| JP | 2005-5229 | 1/2005 |
| JP | 2005-32638 | 2/2005 |
| JP | 2005-228564 | 8/2005 |

* cited by examiner

*Primary Examiner*—Joseph L Williams
(74) *Attorney, Agent, or Firm*—Oblon, Spivak, McClelland, Maier & Neustadt, P.C.

(57) ABSTRACT

The step of forming an opening in an insulating layer to expose a carbon nanotube layer is performed using two types of dry etching different from each other in conditions. In the first-stage dry etching step, a hole is formed in the insulating layer to such a depth as not exposing the carbon nanotube layer. Thereafter, in the second-stage dry etching step, a bottom surface portion of the hole is removed, thus exposing an upper surface of the carbon nanotube layer. A method of manufacturing an electron emission source capable of improving performance of an electron emission portion is thus obtained.

5 Claims, 9 Drawing Sheets

PRESSURE IN REACTION CHAMBER (Pa)

METHOD OF MANUFACTURING ELECTRON EMISSION SOURCE

BACKGROUND OF THE INVENTION

1. Field of the Invention

The present invention relates to a method of manufacturing a field-emission-type electron emission source using a carbon nanotube layer as an electron emission portion.

2. Description of the Background Art

An electron emission source for FED (Field Emission Display) has conventionally been manufactured. In the method of manufacturing the electron emission source, initially, a cathode electrode is formed on a substrate. Then, a carbon nanotube layer serving as an electron emission portion is formed on the cathode electrode. Thereafter, an insulating layer is formed to cover an exposed surface of the cathode electrode and an exposed surface of the carbon nanotube layer, and a gate electrode is formed on the insulating layer. Thereafter, an opening is formed in the gate electrode, and an opening is formed in the insulating layer under the opening in the gate electrode. An upper surface of the carbon nanotube layer is thus exposed.

In forming an opening in the insulating layer described above, reactive ion etching (RIE) representing dry etching is employed. In forming an opening in an insulating film using RIE, however, RIE is performed even when the carbon nanotube layer is exposed. Consequently, the exposed surface of the carbon nanotube layer is damaged. In addition, unnecessary deposits adhere to the exposed surface of the carbon nanotube layer as well as to an inner side surface of the opening in the insulating layer. On the other hand, according to a technique to form the opening in the insulating layer using wet etching, it is difficult to control a shape of the opening in the insulating layer. For the reasons as described above, the conventional methods of manufacturing the electron emission source are disadvantageous in their inability to improve electron emission performance of the carbon nanotube layer.

As one technique to solve the above-described problem, necessity of some kind of process for the exposed surface of the carbon nanotube layer in order to improve the electron emission performance thereof has generally been known. For example, the inventors of the subject application have confirmed that a method of irradiating the carbon nanotube layer with laser beam is effective for a case in which the carbon nanotube layer is employed. This is because, when a plurality of long carbon nanotubes are entangled and raising of the carbon nanotubes is not easy, long carbon nanotubes are cut as a result of irradiation with laser so that a large number of short carbon nanotubes that are more readily raised are formed.

If intensity of the laser emitted to carbon nanotube particles is excessively high, however, the gate electrode of the FED is broken down. In addition, some of the carbon nanotube particles leave the bottom surface of a hole formed to penetrate the insulating layer. Accordingly, the carbon nanotube particles are scattered in the hole and adhere to a sidewall of the hole. Consequently, short-circuiting occurs between the gate electrode and the cathode electrode. Meanwhile, if the intensity of the laser is low, little improvement in the electron emission performance of the carbon nanotube layer is achieved.

SUMMARY OF THE INVENTION

An object of the present invention is to provide a method of manufacturing an electron emission source capable of improving electron emission performance of a carbon nanotube layer.

A method of manufacturing an electron emission source according to the present invention includes the steps of: forming a cathode electrode on a substrate; forming a carbon nanotube layer on the cathode electrode; forming an insulating layer to cover the cathode electrode and the carbon nanotube layer; and forming an opening in the insulating layer to expose the carbon nanotube layer by using dry etching.

In the method of manufacturing the electron emission source according to one aspect of the present invention on the premise as described above, the dry etching step includes first dry etching step of forming a hole to such a depth as not exposing the carbon nanotube layer under a condition that a pressure in a reaction chamber is set to a relatively low value, and second dry etching step of removing a bottom surface portion of the hole to expose the carbon nanotube layer under a condition that the pressure in the reaction chamber is set to a relatively high value.

As described above, the method of manufacturing an electron emission source according to the present invention is characterized in that two types of dry etching different from each other in conditions are used to form an opening in the insulating layer. In the first-stage dry etching out of the two types of etching, the pressure in the reaction chamber is set to a relatively low value. Therefore, undercut of the insulating layer is less likely, and an aspect ratio of the opening formed in the insulating layer can relatively be high. Consequently, surface density of a plurality of openings can be high. Meanwhile, in the second-stage etching out of the two types of dry etching, though the carbon nanotube is exposed, the pressure in the reaction chamber is set to a relatively low value. Therefore, damage to the exposed surface of the carbon nanotube layer can be minimized. The electron emission performance of the carbon nanotube layer can thus be improved, while maintaining high surface density of the plurality of openings.

The method of manufacturing the electron emission source according to another aspect of the present invention, in addition to the premise described above, further includes the step of irradiating an exposed surface of the carbon nanotube layer with laser beam through the opening, and intensity of the laser beam is set to a value from at least 10 mJ/cm$^2$ to at most 200 mJ/cm$^2$.

According to this feature, as the exposed surface of the carbon nanotube layer is irradiated with the laser beam after the dry etching step ends, excellent electron emission performance of the carbon nanotube layer can be achieved.

It has been found through experiments conducted by the present inventors that, in the case that the exposed surface of the carbon nanotube layer is not exposed to a dry-etching atmosphere, the electron emission performance of the carbon nanotube layer is not improved unless the carbon nanotube layer is irradiated with laser beam of relatively high intensity from at least 250 mJ/cm$^2$ to at most 450 mJ/cm$^2$. On the other hand, in the method of manufacturing the electron emission source according to another aspect of the present invention described above, the long carbon nanotubes entangled with each other have already been cut to some extent in the dry etching step. Therefore, in the subsequent step of irradiation with laser, excellent electron emission performance of the carbon nanotube layer can be achieved even with the laser beam of relatively low intensity from at least 10 mJ/cm$^2$ to at most 200 mJ/cm$^2$.

Therefore, there is no possibility that some carbon nanotube particles leave the carbon nanotube layer and adhere to the inner wall of the opening. Consequently, even if the gate electrode is formed in the vicinity of an upper end of the opening, occurrence of short-circuiting between the gate electrode and the cathode electrode can be prevented. In addition, breakdown of the gate electrode due to irradiation with laser can also be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
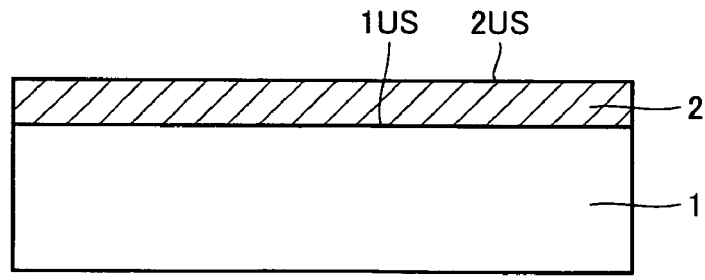
FIGS. 1 to 10 are cross-sectional views illustrating manufacturing steps of an electron emission source according to a first embodiment.
Figure 2:
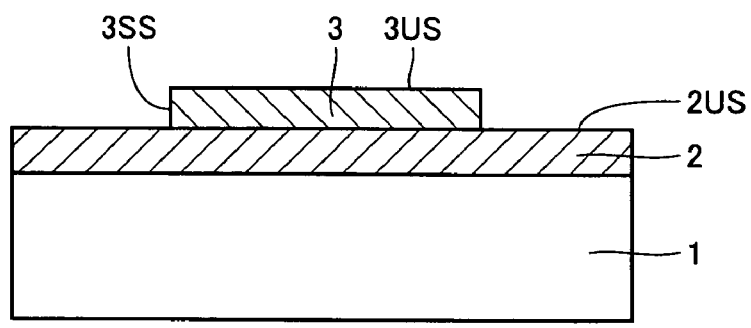
Figure 3:
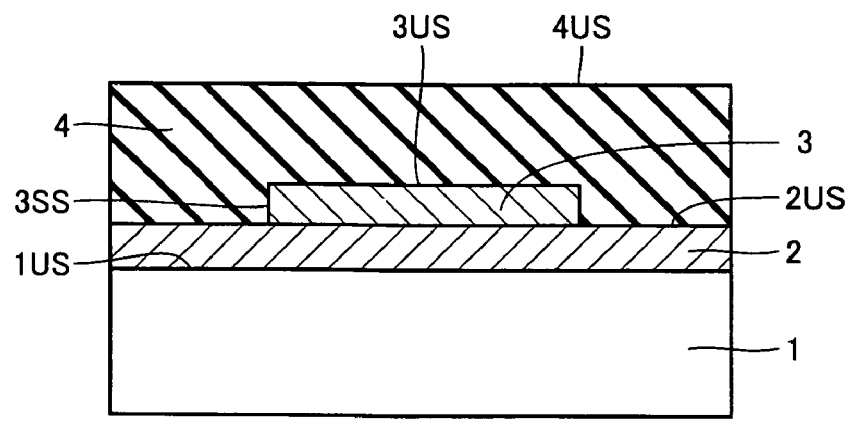
Figure 4:
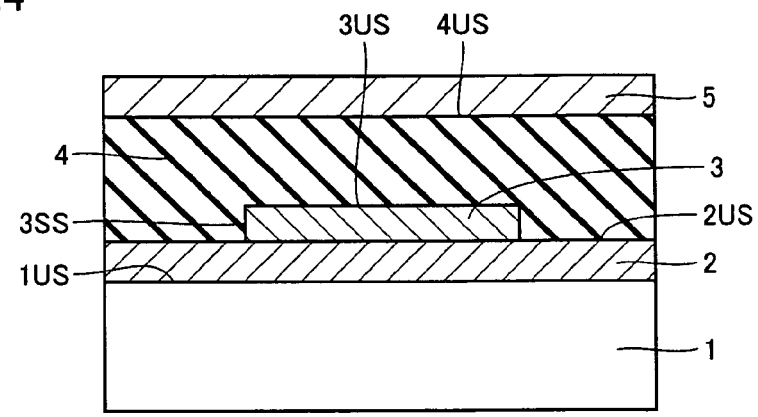
Figure 5:
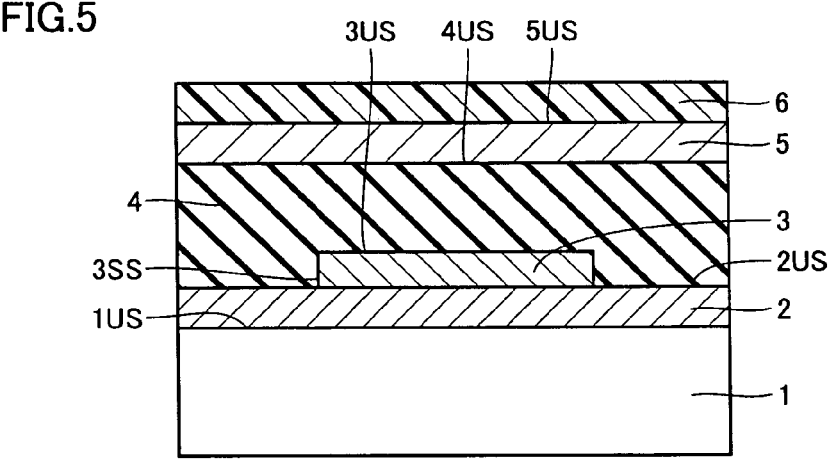
Figure 6:
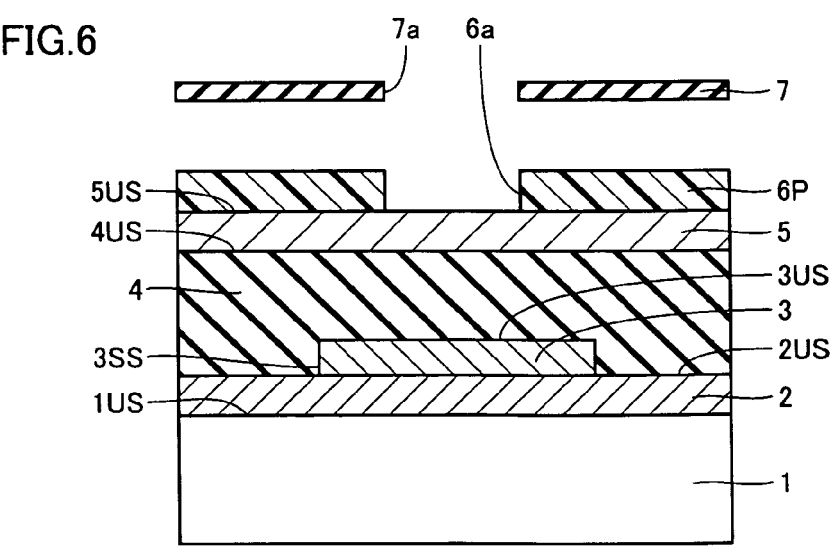
Figure 7:
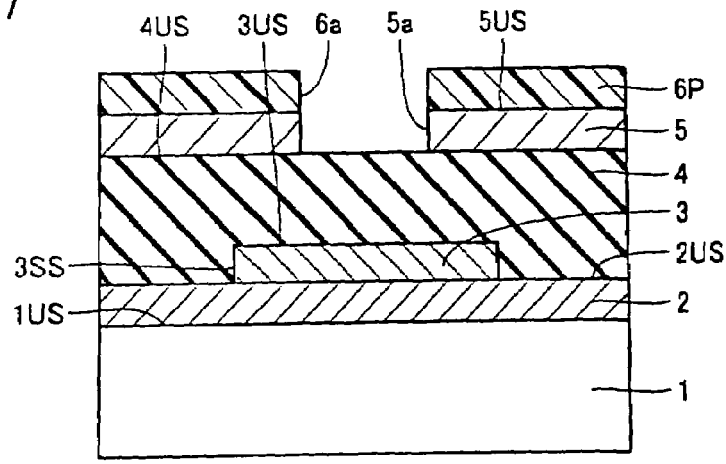

A method of manufacturing an electron emission source according to an embodiment of the present invention will be described hereinafter with reference to the drawings.

First Embodiment

The step of manufacturing an electron emission source used in an FED back panel according to the present embodiment will initially be described with reference to FIGS. 1 to 10.

<Step 1: Formation of Cathode Electrode 2 (See FIG. 1)>

Initially, a cathode electrode 2 is formed on an upper surface 1US of a glass substrate 1, using sputtering. Cathode electrode 2 is implemented, for example, by an ITO film which is a transparent conductive film. For example, the ITO film has a film thickness of 0.3 µm.

Thereafter, cathode electrode 2 is processed to have a linear shape using photolithography or the like. Here, photolithography refers to a photomechanical process using light, electron beam or the like to transfer a pattern onto a planar substrate in a semiconductor manufacturing technology. Though various steps such as application, exposure, etching, removal, and the like of a resist film are carried out in this process, these steps are common and detailed description thereof will not be provided.

<Step 2: Formation of Carbon Nanotube Layer 3 (See FIG. 2)>

Thereafter, a carbon nanotube layer 3 is formed on an upper surface 2US of cathode electrode 2. Here, it is not that carbon nanotube layer 3 is formed to cover the entire upper surface 2US of cathode electrode 2, but that carbon nanotube layer 3 is formed solely on a region located directly under openings 4a and 5a for electron emission to be formed in a post-process and on a region around the same, in upper surface 2US.

More specifically, a paste containing carbon nanotube powders is used to apply carbon nanotube layer 3 onto cathode electrode 2, with a screen printing method. Here, the carbon nanotube powder has an average particles size of 1.5 µm, and a weight ratio of a composition of the paste is as follows: carbon nanotube:ethyl cellulose:butyl carbitol:butyl carbitol acetate=4:13:42:41. The paste described above may contain fine particles of lead glass, silver, or nickel, or the like. As a mask for screen printing, a #250-mesh screen is used.

After carbon nanotube layer 3 is printed on cathode electrode 2, carbon nanotube layer 3 is dried in an atmosphere at a temperature of 150° C. Thereafter, carbon nanotube layer 3 is baked for 10 minutes in the air at a temperature of 450° C., so as to burn and decompose a resin and a solvent in carbon nanotube layer 3. In the case that the paste for screen printing contains fine particles of lead glass, silver, or nickel, or the like described above, the step of baking carbon nanotube layer 3 at a temperature of 540° C. is desirably performed after the above-described step. Here, in order to prevent the carbon nanotube from burning out when the temperature is raised to 540° C., carbon nanotube layer 3 is desirably baked in an $N_2$ atmosphere.

<Step 3: Formation of Insulating Layer 4 (See FIG. 3)>

Thereafter, a varnish silicone ladder polymer solution is applied onto upper surface 2US of cathode electrode 2, a side surface 3SS and an upper surface 3US serving as the exposed surface of carbon nanotube layer 3, and an exposed surface (not shown) of glass substrate 1. Then, the silicone ladder polymer is subjected to heat treatment, so as to form an insulating layer 4 having a film thickness T of approximately 10 µm. More specifically, the following steps are performed.

Figure 12:
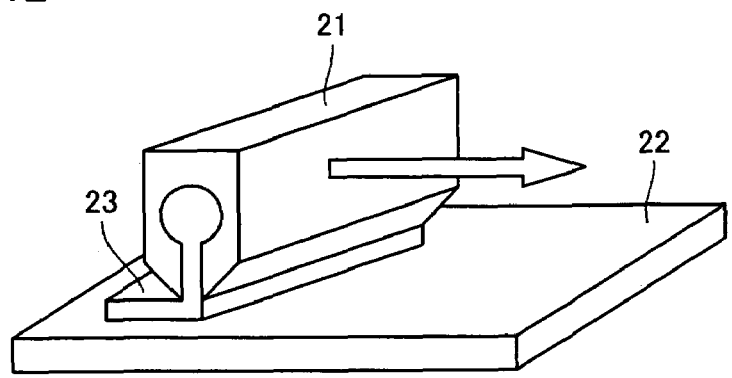
FIG. 12 is a perspective view schematically showing a configuration of a table coater.

Initially, powder polyphenylsilsesquioxane (hereinafter, referred to as "PPSQ") representing the silicone ladder polymer is dissolved in anisole, to prepare a varnish solution. Thereafter, a table coater is used to uniformly apply the varnish solution to cover side surface 3SS and upper surface 3US serving as the exposed surface and the exposed surface of glass substrate 1. Here, concentration of the varnish PPSQ solution is controlled depending on a necessary film thickness of insulating layer 4. The table coater is an apparatus having a slit-shaped ink injection portion 21 as shown in FIG. 12.

When the table coater described above is moved along the surface of a base material 22 at a low speed while a distance between ink injection portion 21 and base material 22 is maintained constant and when the ink is pressed out of slit-shaped ink injection portion 21, a coating film 23 having a uniform film thickness is formed on the surface of base material 22. Here, an amount of pressed-out ink and the moving speed of ink injection portion 21 are controlled such that coating film 23 in a wet state immediately after application has a film thickness of 40 µm. Reflecting difference in height between glass substrate 1 and cathode electrode 2 and difference in height between cathode electrode 2 and carbon nanotube layer 3, the surface of coating film 23 in a wet state immediately after application is uneven. As a result of surface tension of coating film 23, however, the surface of coating film 23 subsequently becomes an even, flat face not having irregularities. Consequently, insulating layer 4 implemented by the coating film formed from varnish PPSQ and having a flat upper surface 4US is formed on glass substrate 1.

Thereafter, a hot plate is used to heat and dry glass substrate 1 on which insulating layer 4 described above has been formed, successively at temperatures of 50° C., 90° C. and 120° C. In addition, glass substrate 1 on which insulating layer 4 has been formed is subjected to heat treatment for one hour at a temperature of 350° C. in the air. PPSQ is thus cured by heat and insulating layer 4 becomes firm. Moreover, insulating layer 4 has film thickness T of approximately 10 µm.

The reason why the temperature for heat treatment using the hot plate described above is raised in a stepped manner is that, if the temperature of coating film 23 is suddenly raised, bubbles may be generated in coating film 23, that is, a solvent component in the coating film should gradually be dried. Temperature conditions given herein are conditions with which best results were obtained in experiments conducted by the present inventors, however, the number of temperature levels for drying the insulating layer using the hot plate may be set to two or one, instead of three. Alternatively, even if the temperature for heat treatment of insulating layer 4 is set to 250° C., a substantially similar result can be obtained.

If the step of curing the varnish PPSQ coating with heat is performed not in the air but in nitrogen, oxidation of the surface of PPSQ can be suppressed. Alternatively, if the step of curing the varnish PPSQ coating with heat is performed not in the air but in vacuum, the time period for treatment can be shorter. Alternatively, if a lower temperature for curing insulating layer 4 is set, deterioration of carbon nanotube layer 3 due to heat can be suppressed. Consequently, excellent electron emission performance of carbon nanotube layer 3 can be achieved.

<Step 4: Formation of Gate Electrode 5 (See FIG. 4)>

Thereafter, a metal film serving as a gate electrode 5 is formed on upper surface 4US of insulating layer 4. For example, DC magnetron sputtering is used to form an Al film on gate electrode 5. In addition to sputtering, vapor deposition, plating and the like are options for the method of forming the metal film.

<Step 5: Formation of Resist Film 6 (See FIG. 5)>

Thereafter, a resist film 6 is formed on the entire upper surface of gate electrode 5. For example, a positive resist liquid is employed, and resist film 6 is applied to gate electrode 5 using spin coating. Thereafter, resist film 6 is dried.

<Step 6: Exposure/Development of Resist Film 6 (See FIG. 6)>

Thereafter, resist film 6 is exposed to light through an exposure mask 7 having an annular opening 7a corresponding to a cross-sectional shape of opening 5a of gate electrode 5 which will be described later. In addition, an alkali developer is used for development, and the resist film in the exposed portion is removed. A resist film 6P having an annular opening pattern 6a is thus formed. Here, opening pattern 6a corresponds to opening 5a. In the present embodiment, though opening 7a of exposure mask 7 is in an annular shape, it may be in a longitudinal slit shape or a lateral slit shape.

<Step 7: Etching of Gate Electrode (See FIG. 7)>

Thereafter, using resist film 6P having opening pattern 6a as a mask, gate electrode 5 is etched to expose a part of upper surface 4US of insulating layer 4. Specifically, the metal film located directly under annular opening pattern 6a in resist film 6P is etched to form opening (hole) 5a penetrating gate electrode 5 in a region immediately above upper surface 3US of carbon nanotube layer 3. For example, if gate electrode 5 is implemented by an Al film, a phosphoric-acid-based etchant is used as the etchant for the Al film. As the etching rate is varied in accordance with the temperature of the etchant, the temperature of the etchant should be maintained at 40° C. during etching of the Al film.

<Step 8: Formation of Opening 4b (See FIGS. 8 and 9)>

Figure 9:
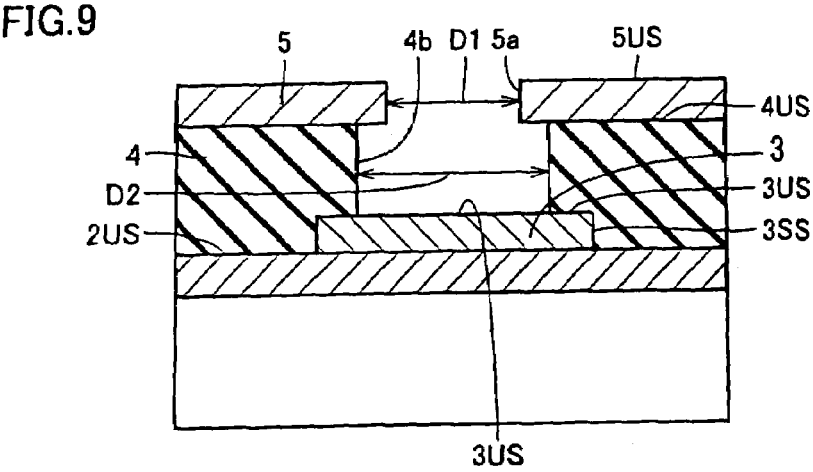

Thereafter, insulating layer 4 is dry-etched downward from the exposed surface of upper surface 4US of insulating layer 4 (bottom surface of opening 5a: see FIG. 7), to form an opening 4b (see FIG. 9). The dry etching step has the first dry etching step and the second dry etching step.

Figure 8:
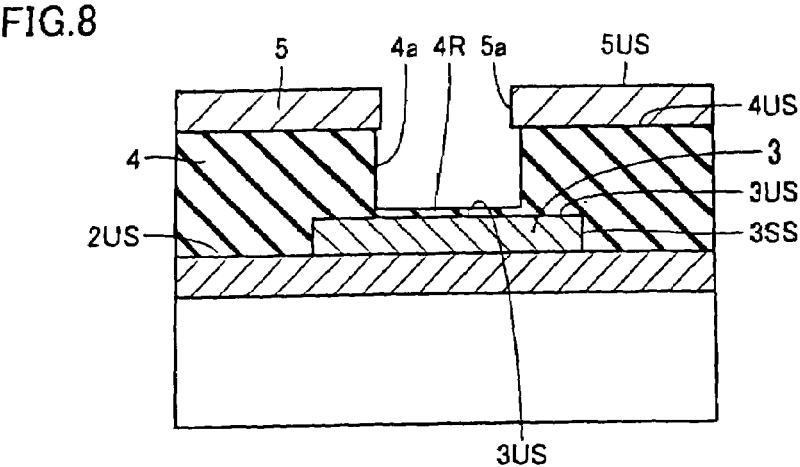

In the first etching step, as shown in FIG. 8, insulating layer 4 is etched to such a depth that an insulating portion 4R having a film thickness of 1 µm remains on upper surface 3US of carbon nanotube layer 3. Hole 4a extending from upper surface 4US to a prescribed depth is thus formed in insulating film 4. In the first dry etching step, parallel plate reactive ion etching is used, and a mixed gas of $CF_4$ and $O_2$ is used as the etching gas. Here, flow rates of $CF_4$ and $O_2$ are set to 75 sccm and 50 sccm, respectively. In addition, plasma power is set to 1600 W, and the pressure in the reaction chamber is set to a relatively low value, that is, 2 Pa.

In the second dry etching step, as shown in FIG. 9, insulating portion 4R having the film thickness of 1 µm that remains after the first dry etching step is removed to form opening 4b, thus exposing upper surface 3US of carbon nanotube layer 3. In the second dry etching step, parallel plate reactive ion etching is used, and a mixed gas of $CF_4$ and $O_2$ is used as the etching gas, as in the first dry etching step. In addition, flow rates of $CF_4$ and $O_2$ are set to 75 sccm and 50 sccm, respectively. Moreover, plasma power is set to 800 W, and the pressure in the reaction chamber is set to a relatively high value, that is, 100 Pa. These two types of dry etching steps may be performed continuously, without opening the reaction chamber in between these steps.

Significance of each of the two types of dry etching steps will now be described. In the first dry etching step, generally known anisotropic etching is performed. $CF_4$ is decomposed into ions or radicals in the plasma, bonded to Si within PPSQ, and thereafter exhausted as $SiF_4$ from the reaction chamber. Meanwhile, $O_2$ is decomposed into ions or radicals in the plasma, bonded to C resulted from decomposition of PPSQ or $CF_4$, and thereafter exhausted as CO from the reaction chamber.

In the first dry etching step of the present embodiment, the pressure in the reaction chamber is set to a relatively low value of 2 Pa. Accordingly, mean free path of ions tends to be long, and the ions move perpendicularly to the main surface of glass substrate 1 as a result of self-bias provided to glass substrate 1 by the plasma. Consequently, the aspect ratio of opening 4a is large. In other words, undercut of insulating layer 4 is small. Namely, an etched distance of insulating layer 4 in a direction in parallel to the main surface of glass substrate 1 under gate electrode 5 (see D2-D1 in FIG. 9) is small. Therefore, a length of an overhang portion of gate electrode 5 is small. That is, a length of a portion of gate electrode 5 protruding inward from a wall surface of opening 4b is small.

The present inventors have confirmed that, when opening 4b is formed to expose carbon nanotube layer 3 under the etching condition in the first dry etching step described above, bombardment of carbon nanotube layer 3 with ions takes place and the electron emission performance of carbon nanotube layer 3 becomes poor.

Figure 13:
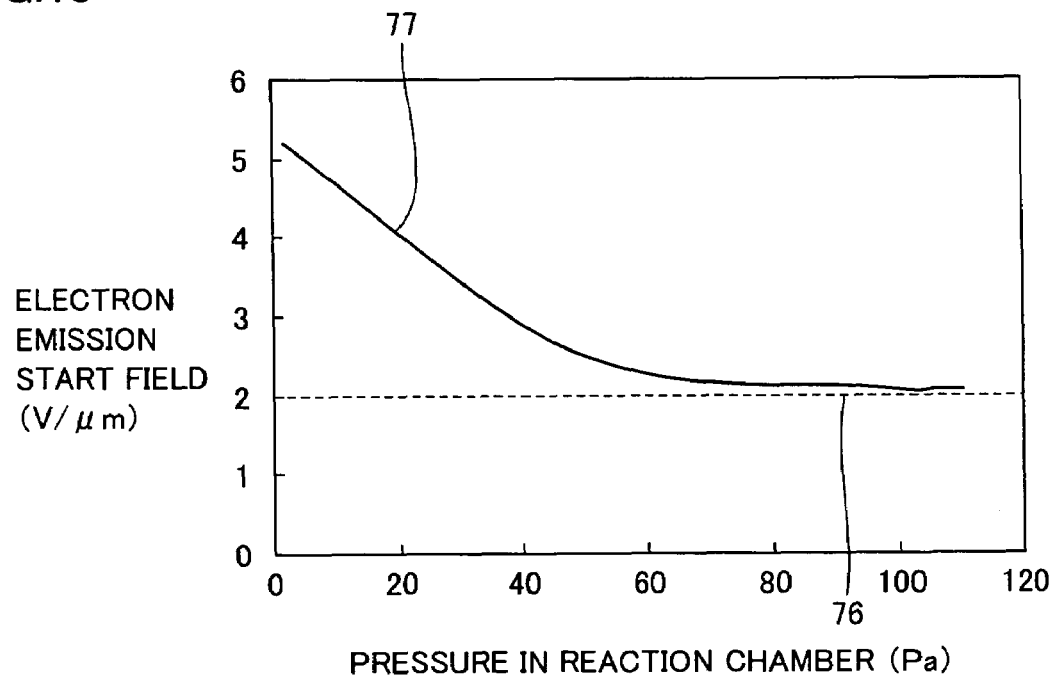
FIG. 13 is a graph showing relation between a pressure in a reaction chamber and field at which electron emission starts.

FIG. 13 and Table 1 show relation between the etching condition (pressure in the reaction chamber) and the electron emission performance (voltage at which electron emission starts). The electron emission performance is evaluated based on relation shown in FIG. 13 and Table 1.

TABLE 1

| No. | Pressure in Reaction Chamber | Field at which Electron Emission Starts (V/μm) |
|---|---|---|
| (1) | (etching not performed) | 2.0 |
| (2) | 2 Pa | 5.2 |
| (3) | 100 Pa | 2.1 |

The following two types of test apparatuses are used in evaluation. The first test apparatus includes a test cathode substrate, in which the carbon nanotube layer of 2 mm-square is formed on a transparent conductive film (ITO) on the glass substrate and a test anode substrate arranged to oppose the test cathode substrate with a vacuum gap of 60 μm being interposed. In the test apparatus, the carbon nanotube layer is not covered with the insulating layer but exposed to vacuum. That is, the carbon nanotube layer in the first test apparatus is free from damage caused by dry etching of the insulating layer.

In the test, a voltage is applied across the transparent conductive film of the test cathode substrate and a fluorescent surface of the test anode substrate, and a voltage at which emission of electrons from the carbon nanotube layer starts is measured. As a result of measurement, as shown with a dashed line 76 in FIG. 13, the field at which electron emission starts (hereinafter, referred to as "electron emission start field") is 2.0 V/μm.

Similar measurement is performed also in the second test apparatus in which the carbon nanotube layer is exposed at the bottom surface of the opening in the insulating layer, separately from the measurement described above. In the measurement, the second test apparatus is formed such that the insulating layer (PPSQ film) is initially formed to cover the 2 mm-square carbon nanotube layer and the entire main surface of the glass substrate, the insulating layer is removed through dry etching, and the carbon nanotube layer is exposed at the bottom surface of the opening in the insulating layer. Namely, as the carbon nanotube layer in the second test apparatus is exposed to the atmosphere for dry etching of the insulating layer, it is damaged to some extent through dry etching.

In this test, several pressures between 2 Pa to 120 Pa are adopted as the pressure in the reaction chamber during dry etching. A solid line 77 in FIG. 13 shows the electron emission start field of the cathode substrate that was processed at each pressure. It can be seen from FIG. 13 that, in the second test apparatus in which the insulating layer is dry-etched under the condition that the pressure in the reaction chamber is set to a value lower than 50 Pa, the electron emission start field increases, that is, the electron emission performance is considerably deteriorated, with lowering in the pressure in the reaction chamber.

On the other hand, it can be seen that the second test apparatus in which the insulating layer was dry-etched under the condition that the pressure in the reaction chamber was set to 50 Pa or higher attains the electron emission performance substantially the same as in the first test apparatus in which the insulating layer has not been etched. Based on these results, the second dry etching step for exposing the carbon nanotube layer will be described hereinafter in detail.

The second etching step is characterized in that it is performed at a high reaction chamber pressure of 10 Pa, as compared with that in the first etching step. If the pressure in the reaction chamber is high, mean free path of the ions is short, and the ions are neutralized before impingement on the surface of the insulating layer or on the exposed surface of the carbon nanotube layer. Accordingly, in the second dry etching step, reaction caused by radicals is dominant. Here, as the operation of radicals is hardly affected by bias of the substrate, impingement of ions having high energy on the carbon nanotube layer hardly occurs, and the electron emission performance is hardly deteriorated as shown in FIG. 13. In addition, when the dry etching in the test apparatus is performed at the reaction chamber pressure of 120 Pa or higher, excellent electron emission performance is also similarly achieved.

On the other hand, it has been found through the experiments conducted by the present inventors that, if the pressure in the reaction chamber is excessively high, stable generation of the plasma becomes difficult and the etching rate becomes unstable. Therefore, the pressure in the reaction chamber is desirably set to a value not larger than 1000 Pa.

In addition, as the etching gas contains $O_2$, resist film 6P is removed in the first etching step. Therefore, it is not necessary to separately carry out the process for peeling the resist film.

<Step 9: Irradiation with Laser Beam>

Figure 10:
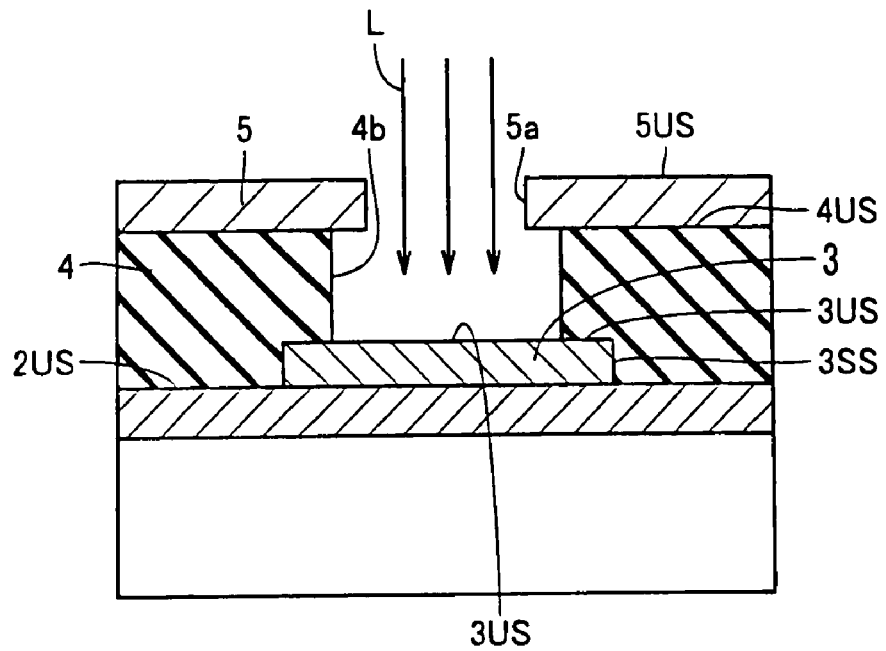

Thereafter, as shown with an arrow L in FIG. 10, the exposed surface of upper surface 3US of carbon nanotube layer 3 exposed in the etching step described above is irradiated with laser beam. A second harmonic of Nd:YAG (Yttrium-Aluminum-Garnet) laser is employed as a laser beam source. The laser beam is shaped like a slit, and the entire exposed surface of carbon nanotube layer 3 is irradiated with the laser beam by sweeping glass substrate 1 with the laser beam source.

It has been confirmed through the experiments conducted by the present inventors that, if the exposed surface of carbon nanotube layer 3 exposed to the etching atmosphere is irradiated with laser beam in the second dry etching step described above, excellent electron emission performance of carbon nanotube layer 3 is achieved, even though the intensity of the laser is relatively low.

Figure 14:
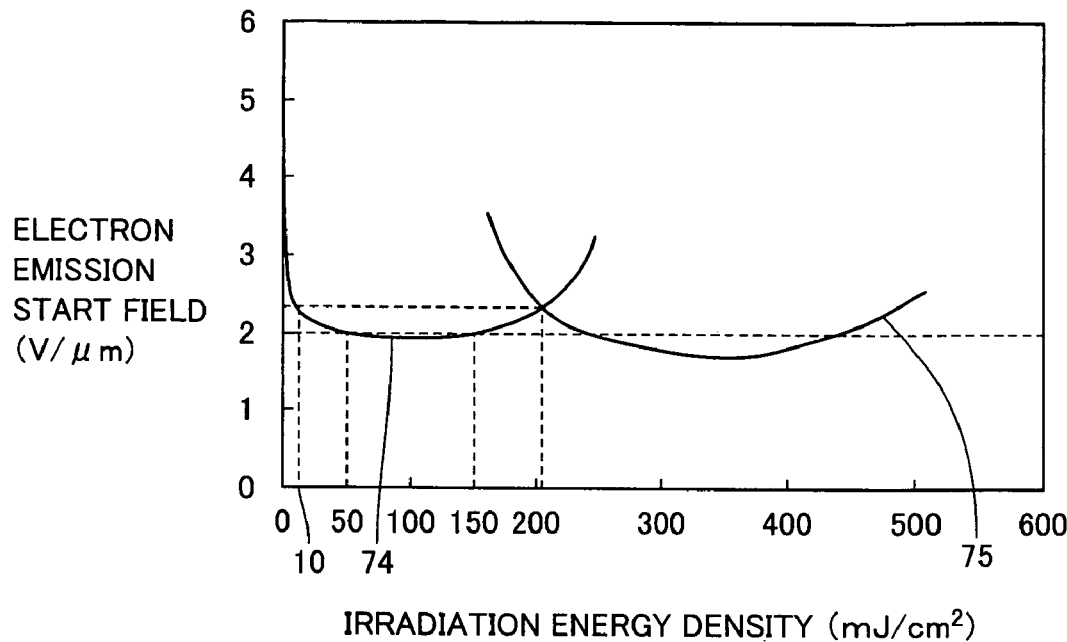
FIG. 14 is a graph showing relation between laser beam intensity and field at which electron emission starts in each of a first test apparatus in which an etching process for an insulating layer is not performed and a second test apparatus in which an etching process for an insulating layer is performed.

FIG. 14 is a graph showing how the relation between the laser beam intensity and the electron emission start field is varied depending on whether the carbon nanotube layer is etched or not. The method of measuring the intensity of the electron emission start field is the same as the method described above.

FIG. 14 shows results of measurement of the electron emission start field, obtained by irradiating the carbon nanotube layer with laser beam of various intensity levels in each of the first test apparatus in which the step of forming and removing the insulating layer is not performed and the second test apparatus in which the step of forming and removing the insulating layer (PPSQ film) was performed.

As can be seen from FIG. 14, in the first test apparatus in which the carbon nanotube layer is not exposed to the dry etching atmosphere, an optimal value for the laser beam intensity is within a range from 250 mJ/cm² to 450 mJ/cm² as shown with a solid line 75, and the electron emission performance of the carbon nanotube layer is not satisfactory even though the carbon nanotube layer is irradiated with the laser beam of the intensity lower than the optimal value.

On the other hand, it can be seen that, in the second test apparatus in which the carbon nanotube layer has been exposed to the dry etching atmosphere, the laser intensity of approximately 100 mJ/cm² is optimal as shown with a solid line 74. In addition, it can be seen from FIG. 14 that, in the second test apparatus, if the intensity of the laser beam is set to 200 mJ/cm² or lower, the electron emission start field of the carbon nanotube layer can be low as in the case of the first test apparatus, with the intensity lower than the intensity of the laser beam emitted in the first test apparatus. Here, as the intensity of the emitted laser beam in the second test apparatus is lower than that in the first test apparatus, degree of damage to the carbon nanotube layer is lower in the second test apparatus. If the intensity of the laser beam is lower than 10 mJ/cm$^2$, however, an effect of laser beam emission is hardly obtained and the electron emission start field suddenly becomes higher. Therefore, in the method of manufacturing the electron emission source according to the present embodiment for forming opening 4b in insulating film 4 using dry etching, in order to improve the electron emission performance of carbon nanotube layer 3, the intensity of the laser beam should be set to a value from at least 10 mJ/cm$^2$ to at most 200 mJ/cm$^2$. In addition, it can be seen that, in the second test apparatus, if the intensity of the laser beam is set to a value from at least 50 mJ/cm$^2$ to 150 mJ/cm$^2$, the electron emission start field can attain to approximately 2 V/μm which is the optimal value.

In this experiment, the dry-etching conditions for exposing the carbon nanotube layer (atmosphere, pressure, and the like) are the same as conditions (atmosphere, pressure, and the like) in the second etching step described above. The reason why such measurement results are obtained is that an impurity on the exposed surface of the carbon nanotube layer is removed and redundant carbon nanotubes are cut in dry etching as described above.

The measurement results described above show the electron emission performance in the test apparatus in which the cathode substrate and the anode substrate are opposed to each other. It is considered that similar measurement results can be obtained also when similar measurement is performed for the electron emission source in which upper surface 3US of carbon nanotube layer 3 is exposed at the bottom surface of opening 4b in the second dry etching step.

Silicone ladder polymer is used as a material for the insulating layer in the method of manufacturing the electron emission source according to the present embodiment. An advantage in forming the insulating layer with silicone ladder polymer will now be described.

As shown in chemical formula 1 below, the silicone ladder polymer according to the present embodiment has a ladder-like siloxane bond as a principal chain, and has a functional group R such as phenyl group, vinyl group, lower alkyl group, or the like, as a side chain. Here, the lower alkyl group refers to a branched or linear alkyl group having carbon number of 1 to 4.

Chemical formula 1

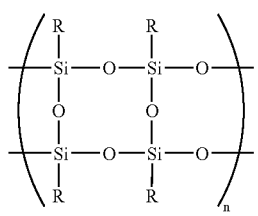

In the present embodiment, the silicone ladder polymer is used as the material for the insulating layer. In addition, in the present embodiment, polyphenylsilsesquioxane having the phenyl group as the functional group is employed as an example of the silicone ladder polymer. Therefore, a film thickness of the insulating layer can be set to a value necessary for ensuring a withstand voltage, for example, to approximately 10 μm.

In the method of manufacturing the electron emission source according to the present embodiment, initially, the varnish PPSQ solution having relatively high viscosity is applied to cover the main surface of the glass substrate, the exposed surface of the cathode electrode, and the exposed surface of the carbon nanotube layer. As the PPSQ solution has high surface tension, the upper surface thereof becomes flat. Thereafter, the PPSQ solution is subjected to heat treatment, to form the polymerized (solidified) insulating layer. Therefore, even though there is difference in height between the upper surface of the glass substrate and the upper surface of the cathode electrode or between the upper surface of the cathode electrode and the upper surface of the carbon nanotube layer, the insulating layer will have the flat upper surface.

As the silicone ladder polymer has low hygroscopicity, expansion of the sidewall of the opening due to swelling of the polymer is relatively small. Therefore, the opening having a satisfactory shape is formed in the insulating layer, and hence a pitch between the openings can be made smaller. In addition, a high-precision electron emission source can be formed by increasing surface density of the openings.

The silicone ladder polymer exhibits excellent heat resistance at a relatively high temperature. For example, PPSQ maintains good heat resistance even at a temperature of approximately 500° C. Therefore, deformation of the insulating layer due to thermal stress applied in the heat treatment step is relatively small. Accordingly, even when the insulating layer described above is employed as a component for the electron emission source of an image display device, it does not deform in the heat treatment step.

In addition, as membrane contraction of the silicone ladder polymer is also small, strain due to membrane stress, that is, stress in an in-plane direction, is small. Therefore, the electron emission source free from defects such as great warpage of the glass substrate or peeling of the insulating layer from the glass substrate can be obtained.

Moreover, as the silicone ladder polymer in a varnish state has already been in a polymer state, variation in its film thickness due to heat treatment is small. Meanwhile, in a general chain silicone polymer, as its own silanol at the terminal attacks its own siloxane (—Si—R$_2$—O—) bond at a high temperature, the chain silicone polymer is decomposed to release six-membered ring or the like. On the other hand, as the silicone ladder polymer has a rigid ladder-shaped structure, it is free from decomposition as described above and has high heat resistance.

The silicone ladder polymer has low hygroscopicity and hardly emits gas. Accordingly, after the electron emission source is introduced into a vacuum container, the electron emission source does not emit gas for a long time. Therefore, abnormal discharge caused by the gas emitted from the insulating layer does not occur in the vacuum container. In addition, deterioration of the carbon nanotube serving as the electron source, that is caused by the ionized gas, is avoided. Moreover, longer period of time necessary for increasing the degree of vacuum in the vacuum container, which results from the gas present in the vacuum container serving as the reaction chamber, is avoided. Though dehydration occurs in silanol at the terminal of the silicone ladder polymer, gas is hardly emitted, because the silicone ladder polymer has extremely high molecular weight and low hygroscopicity.

Second Embodiment

Figure 11:
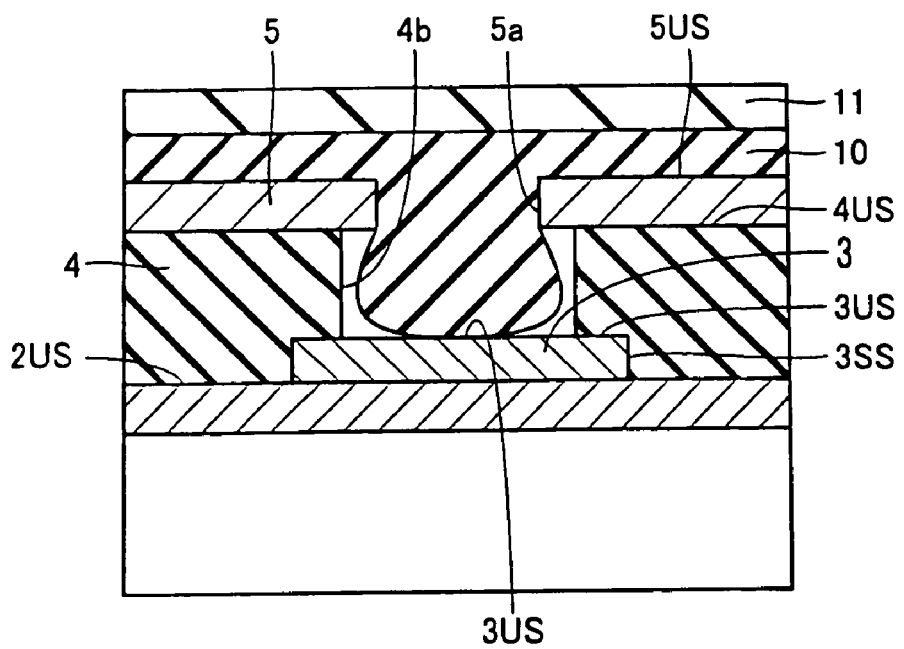
FIG. 11 is a cross-sectional view illustrating a manufacturing step of an electron emission source according to a second embodiment.

According to the first embodiment, after the second dry etching step, the exposed surface of the carbon nanotube layer is irradiated with the laser beam to improve the electron emission performance of the carbon nanotube layer. Instead of irradiation with the laser beam, as shown in FIG. 11, an adhesive 10 and an adhesive tape base material 11 may be used to peel off a surface layer portion of carbon nanotube layer 3 so that the carbon nanotubes are raised, thus improving the electron emission performance of carbon nanotube layer 3. Here, adhesive 10 and adhesive tape base material 11 are shown as examples of an adhesive material, and an adhesive material other than the tape may be employed.

Adhesive 10 has a thickness of approximately 50 μm. Adhesive 10 along with adhesive tape base material 11 is adhered to an upper surface 5US of gate electrode 5, and adhesive 10 is pressed into openings 5a and 4b with an appropriate pressure, so that adhesive 10 reaches the bottom surface of opening 4b. Thereafter, a part of the surface layer portion having a thickness of approximately 0.5 μm is peeled off from carbon nanotube layer 3. As the carbon nanotubes in carbon nanotube layer 3 are raised through this peel-off process, excellent electron emission performance of carbon nanotube layer 3 is achieved.

As described in the first embodiment, a low pressure in the reaction chamber is set in the first dry etching step, and therefore undercut of insulating layer 4 is less likely. Accordingly, the length of a portion of gate electrode 5 serving as the overhang portion is small. Consequently, such a defect that the overhang portion of gate electrode 5 falls in openings 5a and 4b at the time when adhesive 10 and adhesive tape base material 11 are adhered onto gate electrode 5, which results in a defective electron emission source, can be prevented.

Third Embodiment

The first and second embodiments provide, as one example, a method of forming insulating layer 4 by using a table coater to apply PPSQ onto glass substrate 1 and subjecting PPSQ to heat treatment. In the present embodiment, instead of the method described above, a spin coater is used, that is, a spin coating method is used, to apply the varnish PPSQ solution onto glass substrate 1.

It is noted that the screen printing method may be used to apply the varnish PPSQ solution onto glass substrate 1, instead of the spin coating method. In any case, the step of drying PPSQ and subjecting the same to heat treatment in order to form insulating layer 4 is performed in a manner the same as in the first and second embodiments. When the screen printing method is employed as well, insulating layer 4 can have a thickness necessary for ensuring the withstand voltage, while an amount of varnish to be applied during squeezing is controlled to avoid unevenness caused by difference in height between glass substrate 1 and cathode electrode 2 or the like on upper surface 4US of insulating layer 4.

Figure 15:
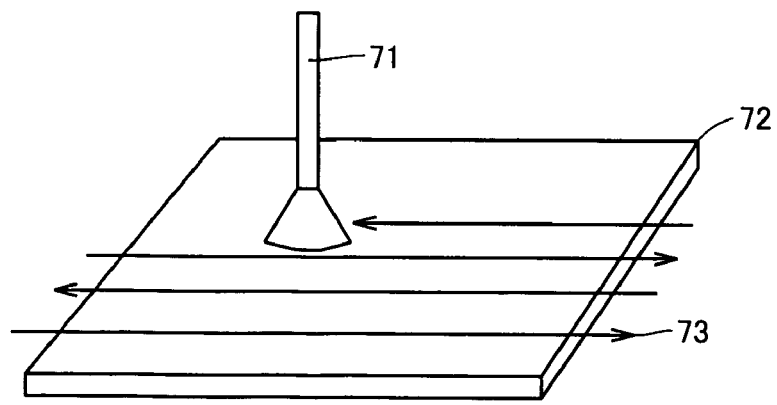
FIG. 15 is a diagram schematically showing an application method using a spray coater.

In addition, in the method of applying the varnish PPSQ onto glass substrate 1, a spray coater may be employed instead of the table coater. The spray coater is used to obtain a flat coating film by moving the spray coater in parallel to an upper surface of a glass substrate 72 in such a manner as sweeping the upper surface as shown with an arrow 73 while injecting a spray varnish from a tip end of a spray nozzle to base material 72, as shown in FIG. 15.

When the varnish is sprayed from the tip end of spray nozzle 71, pressurized air, nitrogen or the like is injected from the tip end of spray nozzle 71 with the varnish being mixed in the spray, and the spray is blown onto glass substrate 72, whereby a homogenous coating film can be obtained. Here, the sweep speed, the sweep interval, and the number of times of sweep by means of spray nozzle 71 are controlled to obtain a necessary film thickness. In addition, viscosity of the varnish, the type of the solvent, and the temperature of the base material are adjusted to obtain satisfactory film quality.

Fourth Embodiment

The process of manufacturing an image display device (FED) according to the present embodiment will be described with reference to FIGS. 16 to 20. FIGS. 16 to 20 show top views of the steps in the process of manufacturing the cathode substrate (back panel) in which the electron emission sources according to the first to third embodiments are arranged in matrix. In addition, FIGS. 16 to 20 show cross-sectional views along the line Y-Y together with the top views, respectively.

Figure 16:
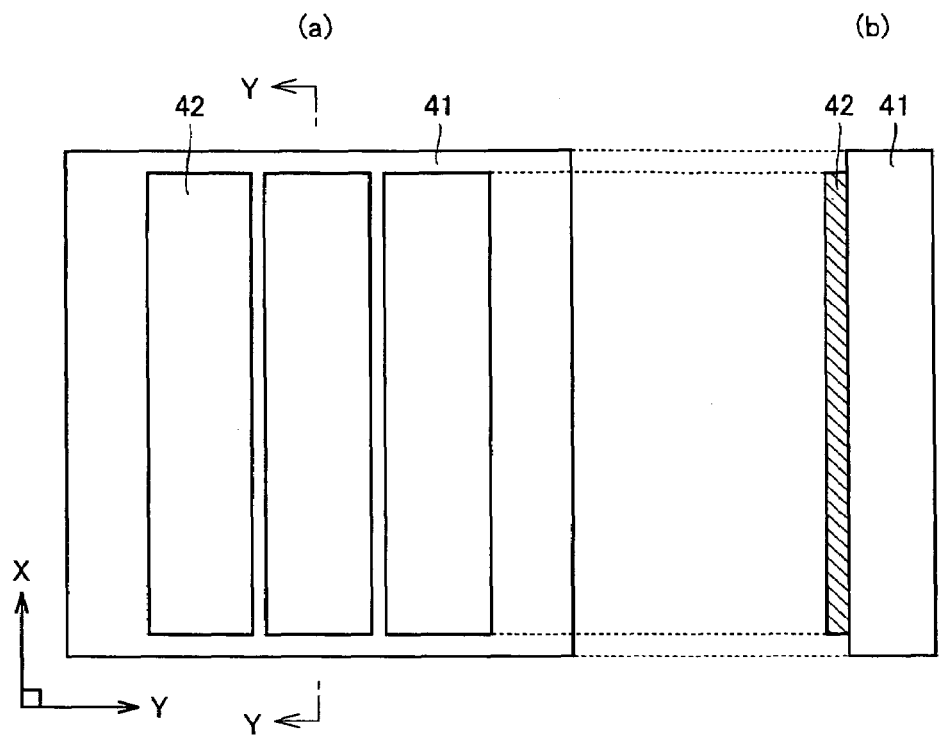
FIGS. 16 to 20 illustrate a method of manufacturing an image display device having the electron emission source according to the embodiment.

Initially, as shown in FIG. 16, a plurality of ITO film stripes extending in an X-axis direction are formed as cathode electrodes 42 on a glass substrate 41. For example, sputtering is employed to form the ITO films on the entire upper surface of glass substrate 41, and thereafter exposure/development using a normal resist film is performed to form a striped pattern of the ITO film. A plurality of cathode electrode stripes 42 extending in the X-axis direction are thus formed.

For color display, one pixel is configured by three light-emitting points of red, blue and green. Therefore, the number of cathode electrodes 42 should be multiple of 3. In the present embodiment, for the sake of simplicity of description, three cathode electrodes 42 are provided.

Figure 17:
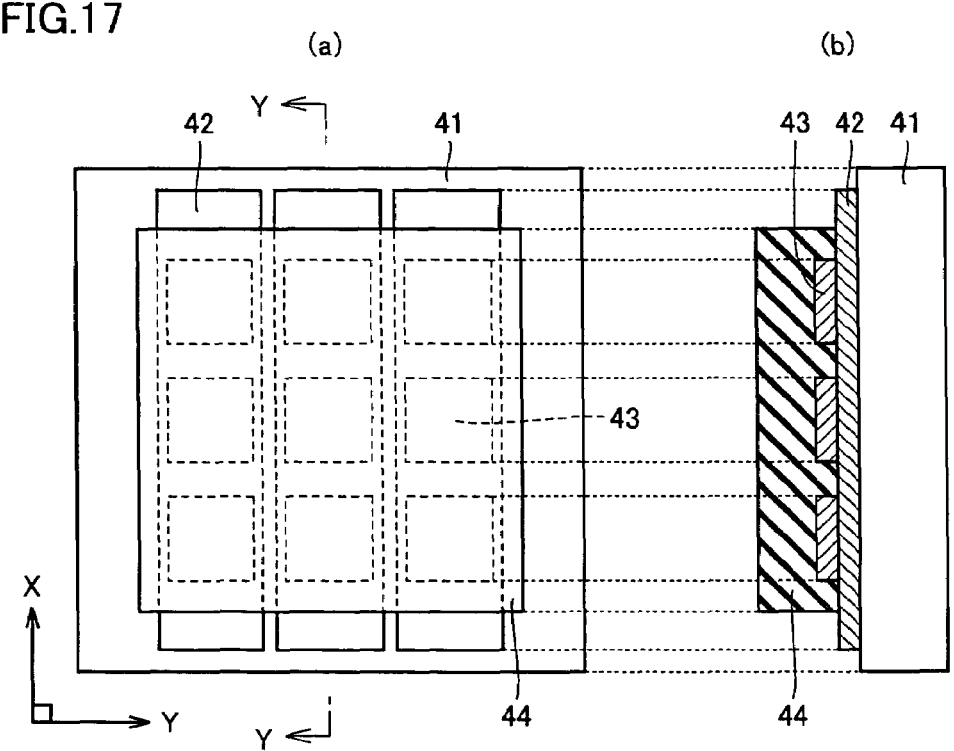

As shown in FIG. 17, a pattern of a plurality of carbon nanotube layers 43 is printed on the upper surface of each of three cathode electrodes 42 at a position directly under the light-emitting point which will be described later. Here, a paste containing carbon nanotube powders is used for screen printing. Thereafter, the printed pattern is dried and baked, to form a plurality of carbon nanotube layers 43 aligned in the X-axis direction on each cathode electrode 42.

Figure 18:
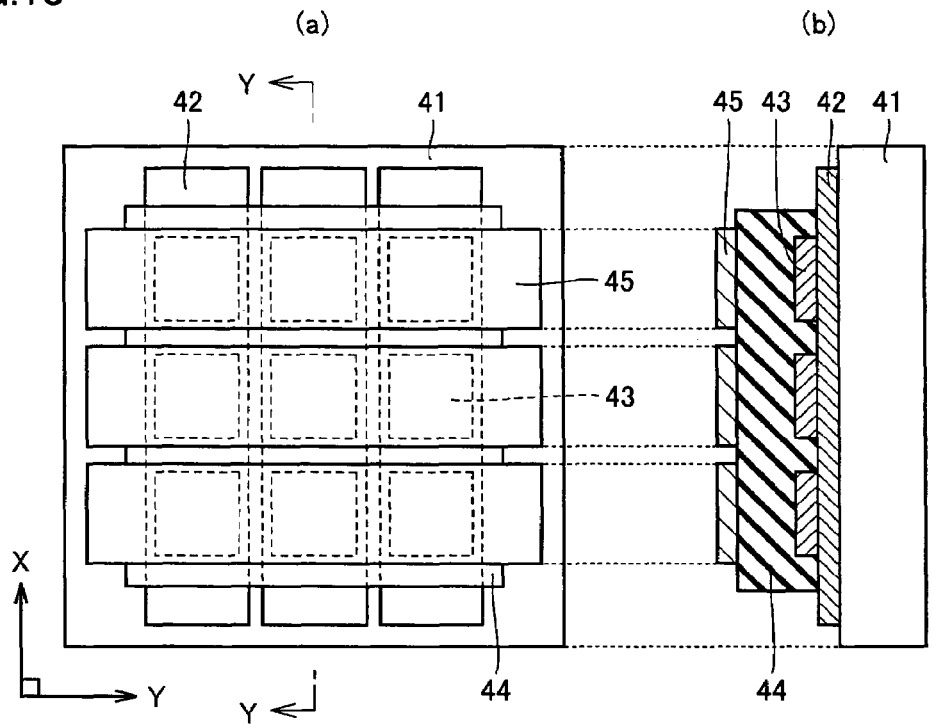

Thereafter, the table coater is used to apply PPSQ on substantially the entire surface of glass substrate 41, except for a peripheral portion of glass substrate 41. Then, PPSQ is dried and subjected to heat treatment, to form an insulating layer 44. Thereafter, as shown in FIG. 18, a metal film is vapor-deposited on the entire upper surface of insulating layer 44 using sputtering, and thereafter exposure/development using a normal resist film is performed to form a plurality of gate electrode stripes 45 extending in a Y-axis direction orthogonal to the X-axis direction in which cathode electrode 42 extends.

Thereafter, a plurality of holes (not shown) are formed on 9 locations where three cathode electrodes 42 and three gate electrodes 45 two-dimensionally intersect, under the condition the same as in the first dry etching step described in the first embodiment. The hole is formed by performing exposure/development using the normal resist film, as in the method of forming gate electrode 45. Patterning of gate electrode stripes 45 and patterning of the holes may simultaneously be performed.

Figure 19:
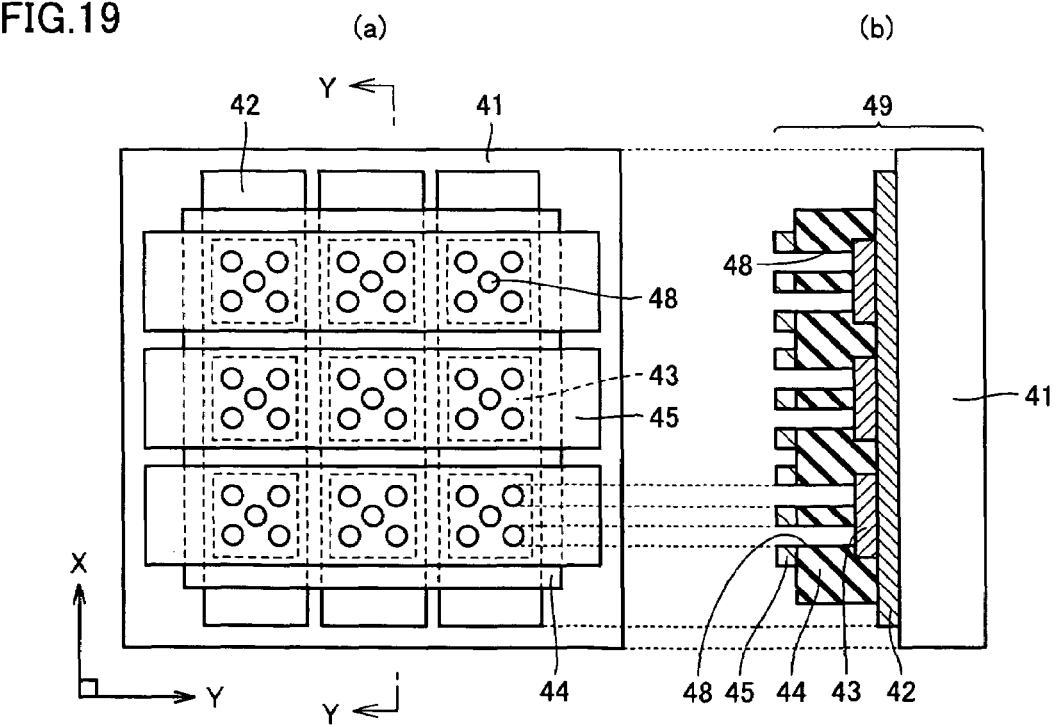

In addition, the bottom surface portion of insulating layer 44 is removed under the condition the same as in the second dry etching step described in the first embodiment. An opening 48 is thus formed in insulating layer 44 as shown in FIG. 19. As opening 48 is formed to penetrate gate electrode 45 and insulating layer 44, the upper surface of carbon nanotube layer 43 is exposed.

As described above, in the present embodiment as well, the dry etching step for forming the opening in the insulating film is implemented as combination of the first dry etching step performed under the condition that the pressure in the reaction chamber is low and the second dry etching step performed under the condition that the pressure in the reaction chamber is high, as in the first embodiment.

Figure 20:
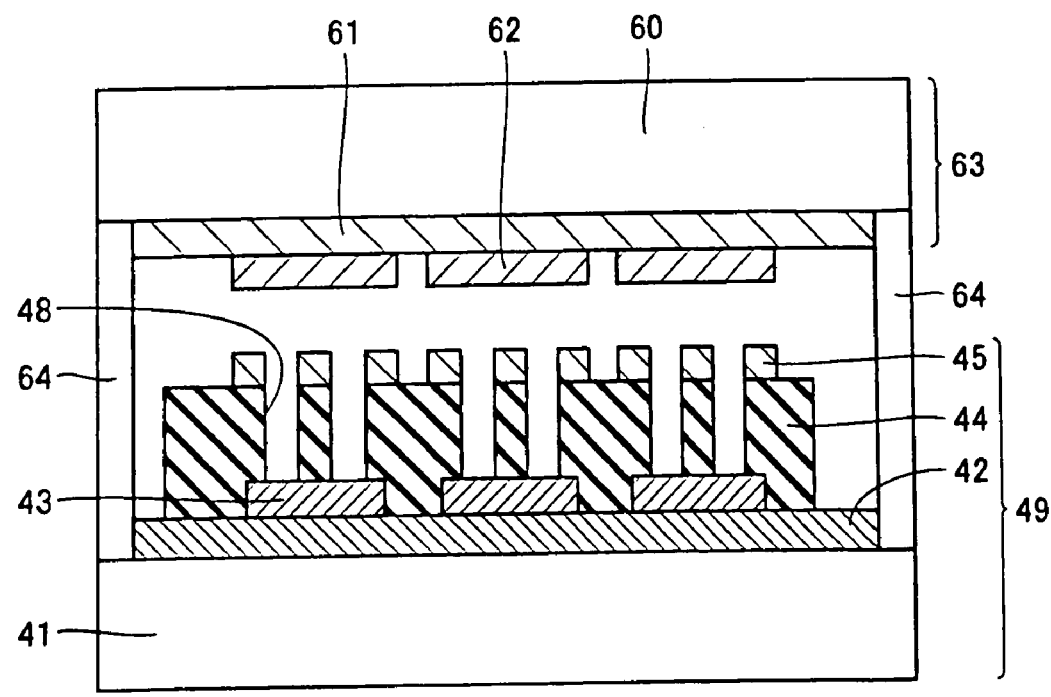

Thereafter, as shown in FIG. 20, a fritted glass 64 is used to join a cathode substrate 49 formed in a series of steps described above and an anode substrate (front panel) 63 in which an anode electrode (second main electrode) 61 and a fluorescent layer 62 are formed on a glass substrate 60. An FED panel in which each fluorescent layer 62 and corresponding carbon nanotube layer 43 are opposed to each other is thus formed. Thereafter, the FED panel is baked for 30 minutes at a temperature of 450° C. in the air. An airtight container of the FED panel is thus formed. Finally, the airtight container is evacuated in order to attain a vacuum state therein. The image display device is thus completed.

According to the method of manufacturing the image display device described above, as the electron emission performance of the carbon nanotube layer is improved, power consumption in the image display device can be lowered. In addition, as the pitch between the cathode electrode and the gate electrode is uniform in all pixels, variation in brightness among the pixels is small. Moreover, even if the FED panel is baked at a temperature of 450° C. in order to implement the airtight container, deformation of the insulating layer is hardly likely and a defective pixel is not produced. Furthermore, as surface density of the openings is high, the number of the carbon nanotube layers in one pixel is increased and uniformity in brightness in the pixel is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an electron emission source, comprising the steps of:
    forming a cathode electrode on a substrate;
    forming a carbon nanotube layer on said cathode electrode;
    forming an insulating layer to cover said cathode electrode and said carbon nanotube layer; and
    forming an opening in said insulating layer to expose said carbon nanotube layer without exposing said cathode electrode, by using dry etching, wherein
    the step of said dry etching includes
    first dry etching step of forming a hole to such a depth as not exposing said carbon nanotube layer under a condition that a pressure in a reaction chamber is set to a first predetermined value, and
    second dry etching step of removing a bottom surface portion of said hole to expose said carbon nanotube layer under a condition that the pressure in the reaction chamber is set to a second predetermined value,
    the first predetermined value begin smaller than the second predetermined value.

2. The method of manufacturing an electron emission source according to claim 1, further comprising the steps of:
    applying an adhesive material to an exposed surface of said carbon nanotube layer through said opening; and
    peeling said adhesive material from said exposed surface.

3. The method of manufacturing an electron emission source according to claim 1, wherein
    said insulating layer contains silicone ladder polymer,
    in said first dry etching step, a mixed gas of $CF_4$ and $O_2$ is used and the pressure in the reaction chamber is set to a value lower than 50 Pa, and
    in said second dry etching step, a mixed gas of $CF_4$ and O2 is used and the pressure in the reaction chamber is set to a value from at least 50 Pa to at most 1000 Pa.

4. A method of manufacturing an electron emission source, comprising the steps of:
    forming a cathode electrode on a substrate;
    forming a carbon nanotube layer on said cathode electrode;
    forming an insulating layer to cover said cathode electrode and said carbon nanotube layer;
    forming an opening in said insulating layer to expose said carbon nanotube layer by using dry etching; and
    irradiating an exposed surface of said carbon nanotube layer with laser beam through said opening; wherein
    intensity of said laser beam is set to a value from at least 10 $mJ/cm^2$ to at most 200 $mJ/cm^2$.

5. The method of manufacturing an electron emission source according to claim 4, wherein
    intensity of said laser beam is set to a value from at least 50 $mJ/cm^2$ to at most 150 $mJ/cm^2$.

* * * * *